Aug. 4, 1936.   W. H. WEDGER   2,049,554
ART OF TEMPORARILY PROTECTING SURFACES OF SHOE PARTS
Filed Dec. 3, 1931
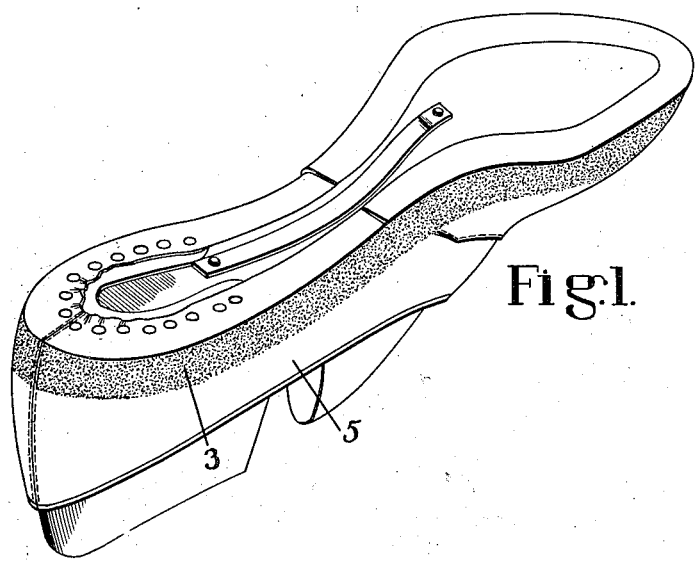
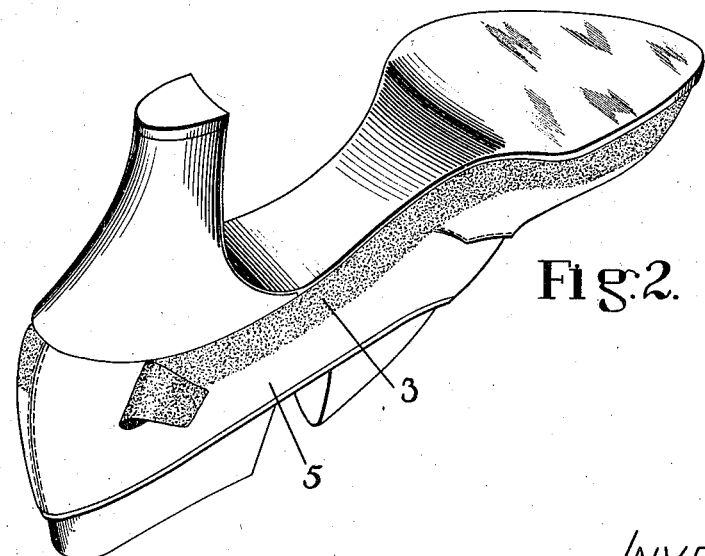
INVENTOR
Walter H. Wedger
By his Attorney,
Harlow M. Davis Patented Aug. 4, 1936

2,049,554

UNITED STATES PATENT OFFICE 2,049,554

ART OF TEMPORARILY PROTECTING SURFACES OF SHOE PARTS

Walter H. Wedger, Belmont, Mass., assignor to Boston Blacking & Chemical Co., Boston, Mass., a corporation of Massachusetts Application December 3, 1931, Serial No. 578,728

14 Claims. (Cl. 12—142)

This invention relates to covering the surface of articles such as shoes to protect them from being soiled or stained during the process of manufacture.

In the manufacture of shoes the display surfaces of certain parts, such for example as those which make up the upper, are subjected to considerable handling and to certain operations whereby they are liable to be soiled and stained. In order to prevent soiling and staining of these parts during the manufacture of the shoe, it has been customary to employ covers of cloth or paper and coatings of various kinds which are usually applied to the lasted shoe before the sole is attached and are removed after having served their purpose.

According to the present invention, a novel and improved cover is provided by applying to a surface which is to be protected a liquid or viscous substance containing rubber, said substance, when dry, forming a protective film or coating which is sufficiently strong and adhesive and which at the same time is capable, when it has served its purpose, of being readily removed. The illustrated film is composed of or has as its principal ingredient rubber which was applied while in a liquid vehicle, for example, in the form of rubber latex, and may be peeled off by means of the fingers.

Referring now to the accompanying drawing, Fig. 1 is a perspective of a lasted shoe ready for the attaching of the sole, a portion of the upper having thereon a protective coating, and Fig. 2 is a perspective of a finished shoe with a portion of the coating removed from the shoe.

The coating may be applied to the surface of any part of the shoe which it is desired to protect and at any stage in the manufacture of the shoe. As herein shown the coating has been flowed upon the upper adjacent to the bottom of the lasted shoe, by means of a brush, and is designed to protect this portion during the subsequent operations upon the shoe.

The illustrated protective film 3 on the surface of the upper 5 resulted from the application of rubber latex mixed with certain other ingredients as will be explained in detail below. Any suitable latex may be employed, for example, latex protected by a casein-formaldehyde condensation product as disclosed in United States Letters Patent No. 1,967,639, granted July 24, 1934, on an application filed in my name. Except that the rubber content must be sufficient to form a suitably tough film for the particular protection desired, said rubber content may vary widely. Preferably there will be mixed with the latex a powdered inert filler such as Leamore clay or kaolin to give body to the latex and also preferably to impart to it some color so that the operator may readily see the coating after it has been applied. In order to increase the flowing quality of the coating, there may be added to it a substance which acts to increase such quality by decreasing the surface tension, for example, sodium sulfonates of tetraline or hexaline, or a water-soluble oil such as Turkey red oil; and if it is desired to produce a particularly strong film which will withstand comparatively hard treatment during the manufacture of the shoe, a fibrous substance such as wood pulp may be employed. A suitable coating substance containing latex, a filler, a soluble oil, and a fibrous material may be made according to the following formula:

| | Ounces |
|---|---|
| Wet wood pulp (25% solids) | 4 |
| Latex | 32 |
| Turkey red oil | 1 |
| Leamore clay | 16 |

The pulp, latex and oil are first thoroughly mixed and then the clay is slowly added until a substance of the desired consistency is obtained.

The film which results from this mixture is one which may be applied with a brush, is strong and adherent enough when so applied and dried to protect the surface of a shoe part such as an upper from the time the shoe part has been cut out until the shoe is finished, and may be readily peeled off in larger or smaller pieces by the fingers of an operator in the manner indicated in Fig. 2. When used upon some materials such as fabric or suede leather, it may be found that the coating adheres more firmly than is desirable; and, if so, a small quantity of a hydrophilic colloid, for example gelatin, or a water-swelling gum such as tragacanth, may be added to the coating to weaken somewhat the naturally strong adhesion of the dried latex.

Although the formula given above represents what has been found to be the best composition suitable for all uses of a protective covering, it should be understood that in particular cases it is possible to use merely a film-forming substance, such as rubber, in a suitable vehicle, and that in other cases, one or more of the other ingredients may be embodied in the coating liquid as may be found desirable or necessary.

Having thus described the invention, what I claim as new and desire to secure by Letters Patent of the United States is:

1. A shoe part having on a display surface thereof a removable protective coating comprising a film of rubber containing a powdered filler.

2. A shoe part having on a display surface thereof a removable protective coating comprising a film of rubber containing a fibrous substance and a powdered filler.

3. A shoe part having on a display surface thereof a removable protective coating comprising a film of rubber containing a hydrophilic colloid.

4. A shoe part having on a display surface thereof a removable protective coating comprising a film of rubber containing a fibrous substance and a water-soluble oil.

5. A shoe part having on a display surface thereof a removable protective coating comprising a film of rubber containing a water-swelling gum.

6. The method of treating a shoe part which comprises applying to a surface thereof a wet, freely flowing coating containing rubber, permitting the coating to dry to form a tough, lightly adherent protective film, subjecting a partly finished shoe in which the part is incorporated to shoe manufacturing operations, and subsequently peeling off the film.

7. The method of treating a shoe part which comprises applying to a surface thereof a wet, freely flowing coating of rubber latex, permitting the coating to dry to form a tough, lightly-adherent protective film, subjecting a partly finished shoe in which the part is incorporated to shoe manufacturing operations, and subsequently peeling off the film.

8. A liquid free-flowing composition of matter adapted to form a thin tough protective coating upon an article of leather or fabric, said composition comprising rubber latex, a filler and a substance which acts to increase the flowing quality of the liquid by decreasing its surface tension.

9. A liquid free-flowing composition of matter adapted to form a thin tough protective coating upon an article of leather or fabric, said composition comprising rubber latex, a filler, a fibrous substance and a substance which acts to decrease the surface tension of the liquid.

10. A liquid free-flowing composition of matter adapted to form a thin tough protective coating upon an article of leather or fabric, said composition comprising rubber latex, a filler, a hydrophilic colloid and a substance which increases the flowing quality of the coating.

11. A shoe part having on a display surface thereof a removable protective coating comprising a film of rubber containing clay.

12. A shoe part having on a display surface thereof a removable protective coating consisting predominantly of rubber and clay, each of these two substances forming a large part of the coating.

13. The method of treating a shoe part, prior to subjecting the part to shoe-manufacturing operations, which comprises applying to a display surface thereof a wet, freely flowing coating of rubber latex containing a clay and allowing the coating to dry to form a tough, lightly adherent protective film which, after the completion of the shoe manufacturing operations, may be readily peeled off.

14. The method of treating a shoe part, prior to subjecting the part to shoe-manufacturing operations, which comprises applying to a display surface thereof a wet, freely flowing coating comprising rubber latex and clay each of which forms a large part of the coating, and allowing the coating to dry to form a tough, lightly adherent protective film in which rubber and clay are the predominant constituents, and which may be readily peeled off after the completion of the shoe manufacturing operations.

WALTER H. WEDGER.